United States Patent [19]

Oldenburg, Jr.

[11] Patent Number: 5,299,381
[45] Date of Patent: Apr. 5, 1994

[54] CHRISTMAS TREE STAND APPARATUS

[76] Inventor: Gaylon E. Oldenburg, Jr., RR #1, Box 92AA, Parkhurst Rd., Oswego, N.Y. 13126

[21] Appl. No.: 14,734

[22] Filed: Feb. 8, 1993

[51] Int. Cl.⁵ .............................................. A47G 7/02
[52] U.S. Cl. ...................................... 47/40.5; 248/527
[58] Field of Search ................ 47/40.5, 39; 248/521, 248/527

[56] References Cited

U.S. PATENT DOCUMENTS

| | | | |
|---|---|---|---|
| 1,694,815 | 12/1928 | Garlick | 248/521 |
| 2,500,215 | 3/1950 | Swearingen | 47/40.5 |
| 2,617,617 | 11/1952 | Krastel | 47/40.5 |
| 3,337,169 | 8/1967 | Griffin | 47/40.5 |
| 3,697,026 | 10/1972 | Hambrick | 47/40.5 |
| 4,125,965 | 11/1978 | Schweim | 47/39 |
| 4,993,176 | 2/1991 | Spinosa | 47/40.5 |

Primary Examiner—Henry E. Raduazo
Attorney, Agent, or Firm—Leon Gilden

[57] ABSTRACT

A container includes a plurality of support legs, with each of the support legs having a plurality of wheel members adjustably mounted to the supports to provide for ease of leveling of the container structure, wherein the container in addition to the Christmas tree fastening rod members includes a support channel arranged to receive a first conduit, with the first conduit arranged for receiving a second conduit, and the second conduit having a bowl member to direct fluid from the bowl member through the first conduit and second conduit into the container in a remote manner to permit ease of watering of a Christmas tree mounted within the container structure.

4 Claims, 4 Drawing Sheets

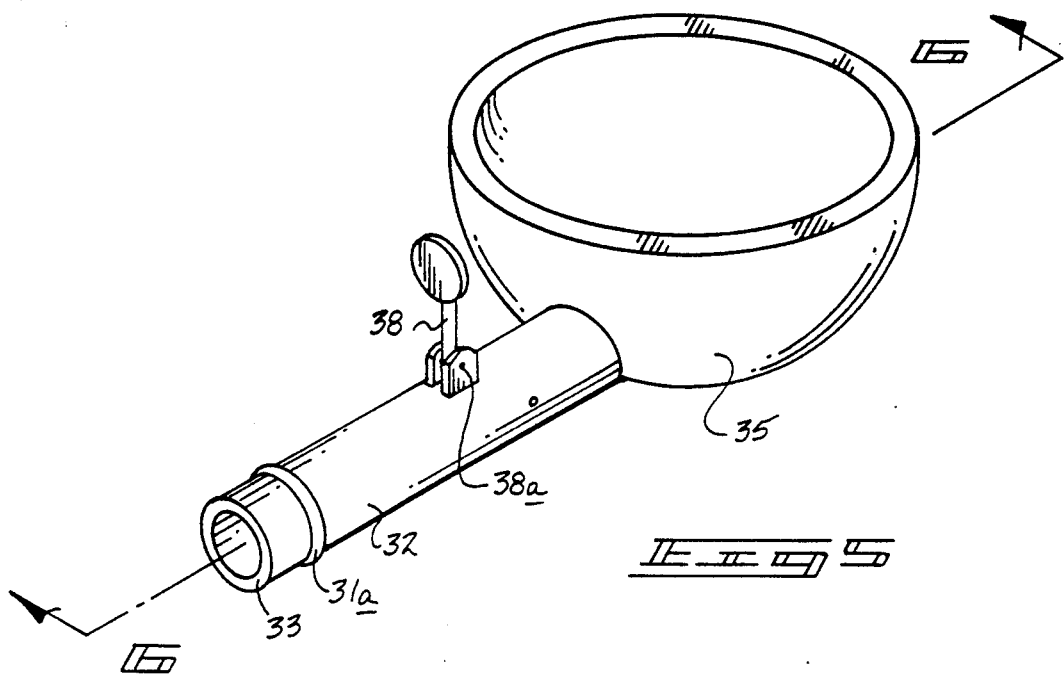
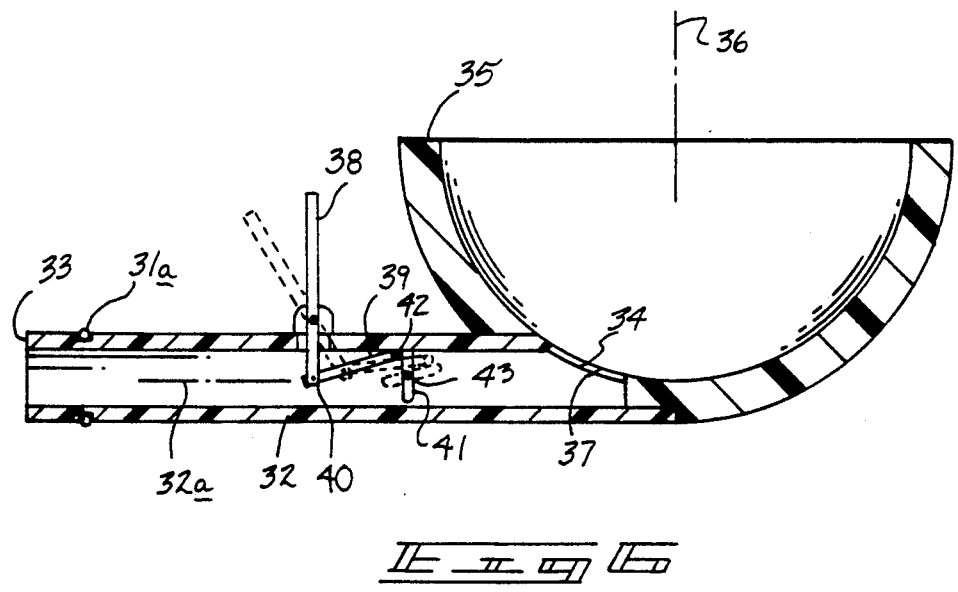

CHRISTMAS TREE STAND APPARATUS

BACKGROUND OF THE INVENTION

1. Field of the Invention

The field of invention relates to Christmas tree stand structure, and more particularly pertains to a new and improved Christmas tree stand apparatus arranged for the remote watering of a Christmas tree relative to a support container.

2. Description of the Prior Art

Christmas tree stands of various types are utilized throughout the prior art and exemplified by the U.S. Pat. Nos. 5,014,461; 3,885,763; and 4,976,411.

The instant invention attempts to overcome deficiencies of the prior art by providing for ease of watering of a Christmas tree within a support container and in this respect, the present invention substantially fulfills this need.

SUMMARY OF THE INVENTION

In view of the foregoing disadvantages inherent in the known types of Christmas tree stand apparatus now present in the prior art, the present invention provides a Christmas tree stand apparatus wherein the same is arranged to include a plurality of conduits arranged for remote mounting relative to a support container to ease the directing of watering fluid within the container. As such, the general purpose of the present invention, which will be described subsequently in greater detail, is to provide a new and improved Christmas tree stand apparatus which has all the advantages of the prior art Christmas tree stand apparatus and none of the disadvantages.

To attain this, the present invention provides a container including a plurality of support legs, with each of the support legs having a plurality of wheel members adjustably mounted to the supports to provide for ease of leveling of the container structure, wherein the container in addition to the Christmas tree fastening rod members includes a support channel arranged to receive a first conduit, with the first conduit arranged for receiving a second conduit, and the second conduit having a bowl member to direct fluid from the bowl member through the first conduit and second conduit into the container in a remote manner to permit ease of watering of a Christmas tree mounted within the container structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Christmas tree stand apparatus which has all the advantages of the prior art Christmas tree stand apparatus and none of the disadvantages.

It is another object of the present invention to provide a new and improved Christmas tree stand apparatus which may be easily and efficiently manufactured and marketed.

It is a further object of the present invention to provide a new and improved Christmas tree stand apparatus which is of a durable and reliable construction.

An even further object of the present invention is to provide a new and improved Christmas tree stand apparatus which is susceptible of a low cost of manufacture with regard to both materials and labor, and which accordingly is then susceptible of low prices of sale to the consuming public, thereby making such Christmas tree stand apparatus economically available to the buying public.

Still yet another object of the present invention is to provide a new and improved Christmas tree stand apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific object attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of the second conduit and watering cup structure of the invention.

FIG. 6 is an orthographic view, taken along the lines 6—6 of FIG. 5 in the direction indicated by the arrows.

DESCRIPTION OF THE PREFERRED EMBODIMENT

Figure 1:
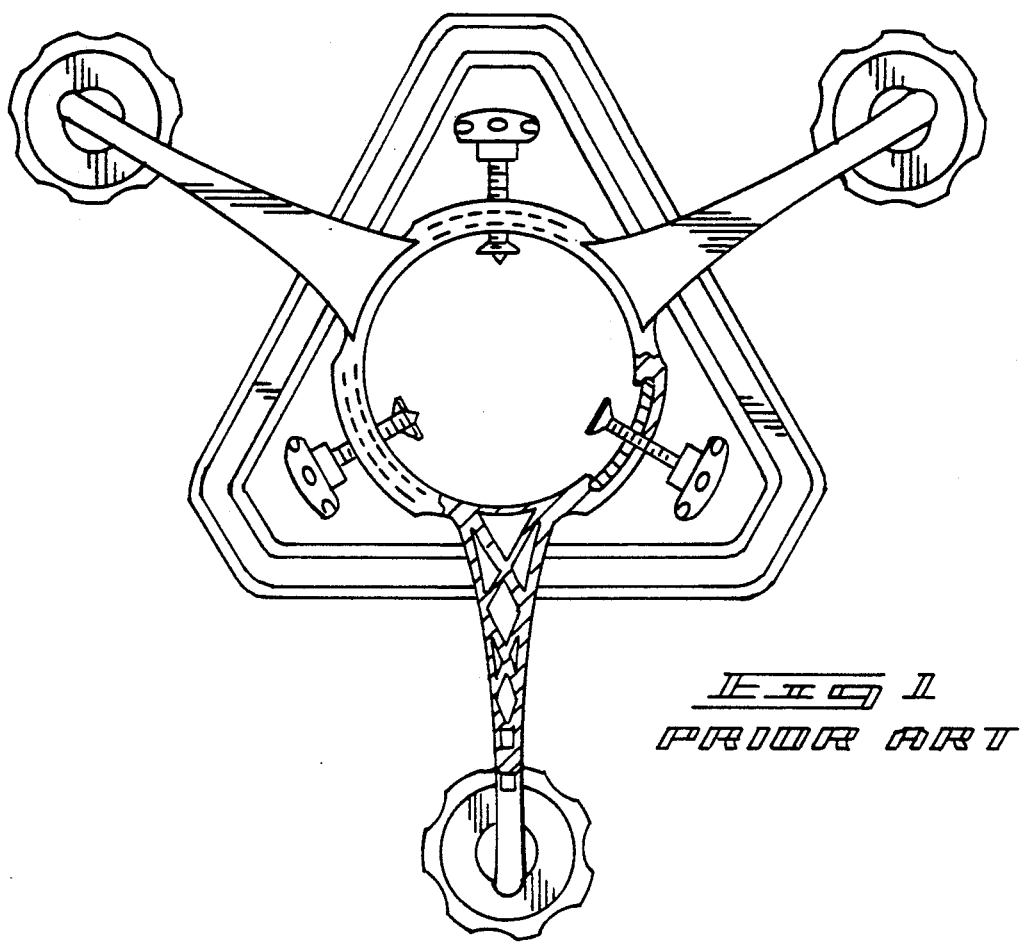
FIG. 1 is an orthographic top view of a prior art Christmas tree stand apparatus as indicated in the U.S. Pat. No. 5,014,461.
Figure 2:
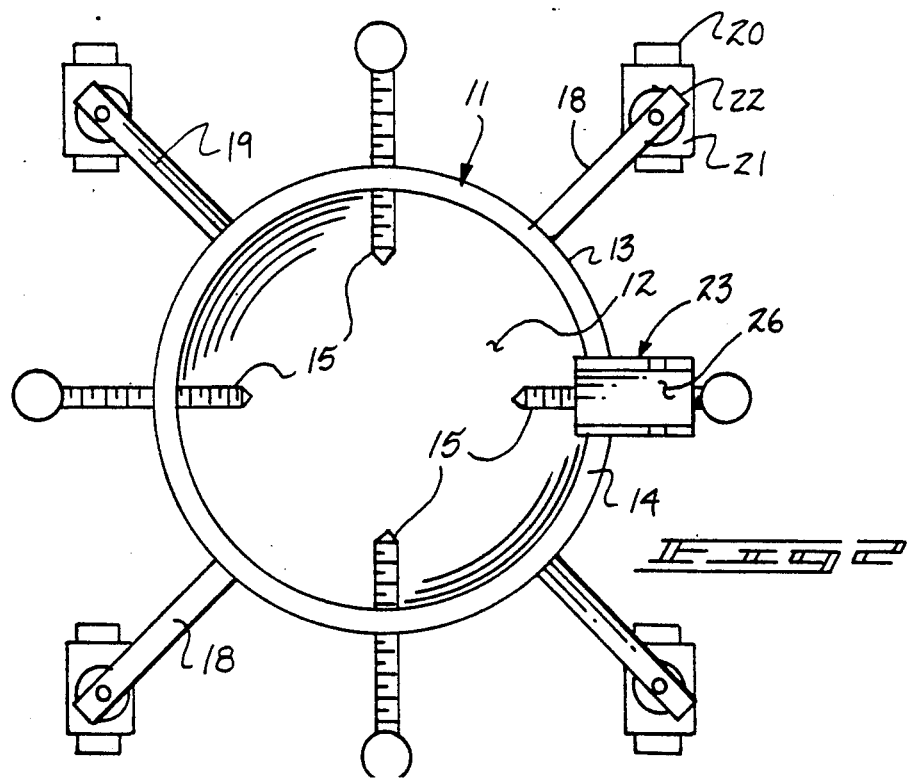
FIG. 2 is an orthographic top view of the invention.
Figure 3:
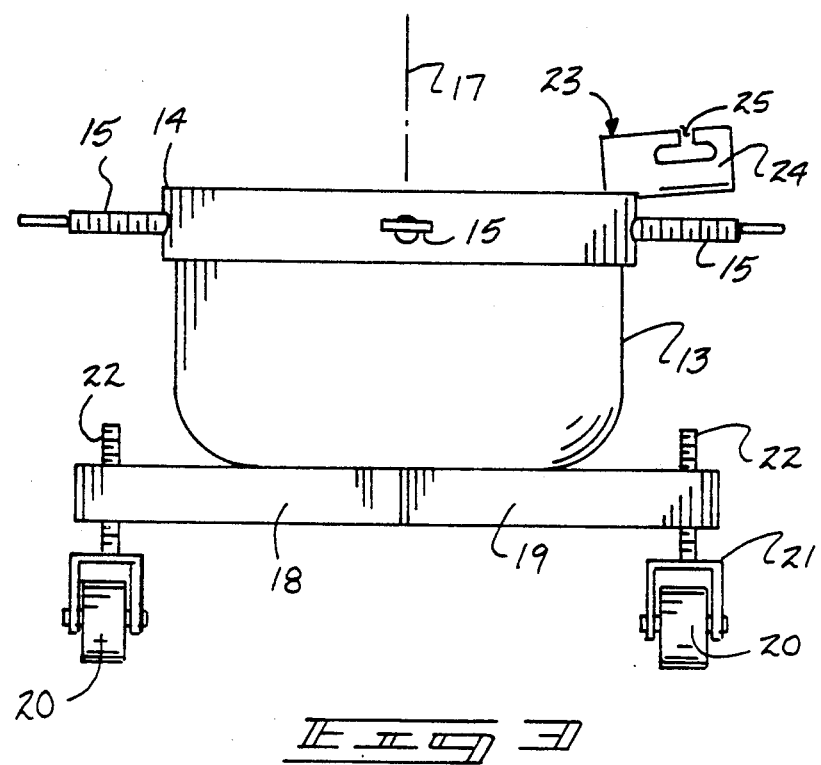
FIG. 3 is an orthographic side view of the invention.
Figure 4:
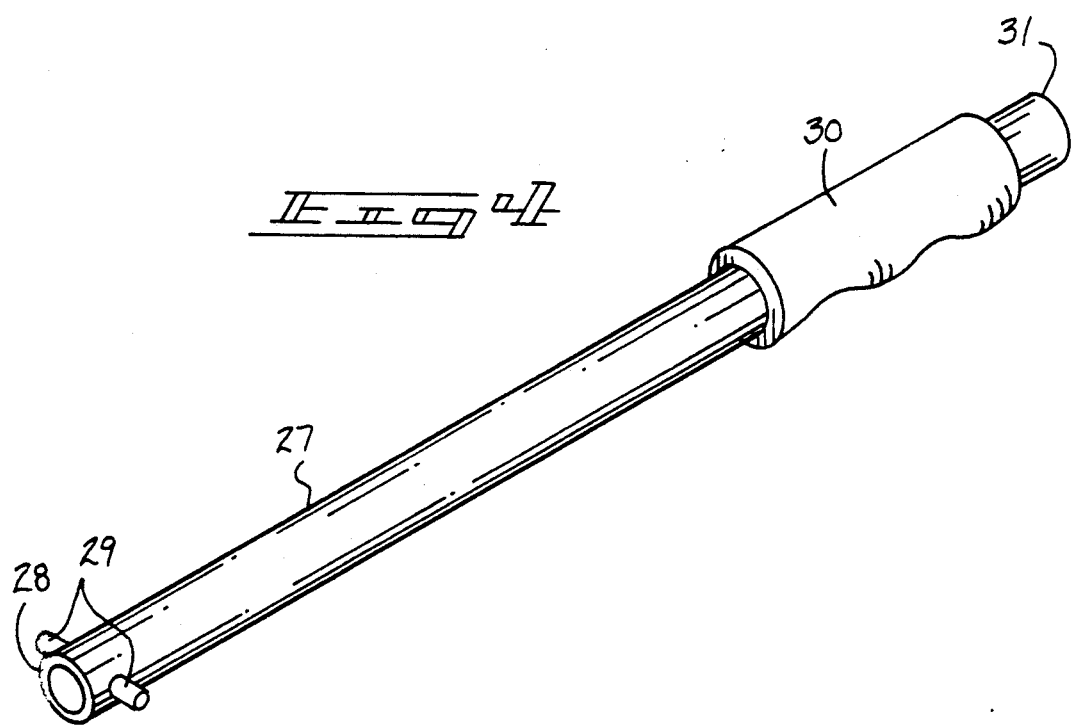
FIG. 4 is an isometric illustration of the first conduit structure of the invention.

With reference now to the drawings, and in particular to FIGS. 1 to 7 thereof, a new and improved Christmas tree stand apparatus embodying the principles and concepts of the present invention and generally designated by the reference numeral 10 will be described.

More specifically, the Christmas tree stand apparatus 10 of the instant invention essentially comprises a container 11, having a container floor 12 and a container side wall 13 terminating in a continuous entrance end 14. A plurality of fastener rods 15 are radially aligned with the side wall 13 orthogonally oriented relative to the container axis 17, with each of the fastener rods 15 threadedly directed through the container side wall 13 to secure a Christmas tree therebetween. First and second support legs 18 and 19 orthogonally intersecting one another in a fixed relationship are fixedly mounted to a bottom surface of the container floor 12 orthogonally oriented relative to the axis 17. Each of the first and second support legs 18 and 19 includes a wheel member 20 rotatably mounted at an outer portion of each of the support legs, wherein each of the wheel members 30 is rotatably mounted within a bifurcated support 21 that in turn includes an externally threaded support rod 22 threadedly directed adjacent each outer distal end of the support legs 18 and 19. The externally threaded fastener rods 22 are arranged parallel relative to one another and spaced an equal distance and parallel to the axis 17 threadedly directed through the support legs, as illustrated in the FIGS. 2 and 3 for example.

A U-shaped support 23 is fixedly mounted to the entrance end 14, with the U-shaped support 23 having parallel side walls 24, with each of the side walls 24 having a T-shaped slot 25. The T-shaped slots 25 accordingly are arranged in a parallel coextensive relationship relative to one another, with the U-shaped support 23 defining a support channel 26 that is inclined at an oblique angle and extending into the container 11.

A first conduit 27 having a first conduit exit end 28 and a first conduit entrance end 31 is provided, with a plurality of guide lugs 29 fixedly mounted to the first conduit exit end 28 adjacent thereto, with the guide lugs 29 longitudinally aligned on opposed sides of the first conduit 27, with each of the lugs 29 received within one of the T-shaped slots 25 to permit ease of mounting of the first conduit 27 within the U-shaped support 23. A circumferentially oriented and resilient handle sheath 30 is fixedly secured to the first conduit 27 adjacent the first conduit entrance end 31. The first conduit entrance end 31 is arranged to receive a second conduit 32, and more specifically a second conduit exit end 33. An "O" ring 31a is illustrated to provide sealing of the second conduit exit end 33 within the first conduit entrance end 31. It should be noted that the second conduit 32 is symmetrically oriented about a second conduit axis 32a. A cup member 35 is fixedly mounted to the second conduit 32 at the second conduit entrance end 34, with the cup member 35 symmetrically oriented about a cup member axis 36 that in turn is orthogonally oriented relative to the second conduit axis 32a. The cup member includes a cup member exit opening 37 that is coextensive with the second conduit entrance end 34 to direct fluid from the cup member 35 through the second conduit 32 and through the first conduit 27 and direct such fluid along the U-shaped support channel 26 into the container 11.

Figure 7:
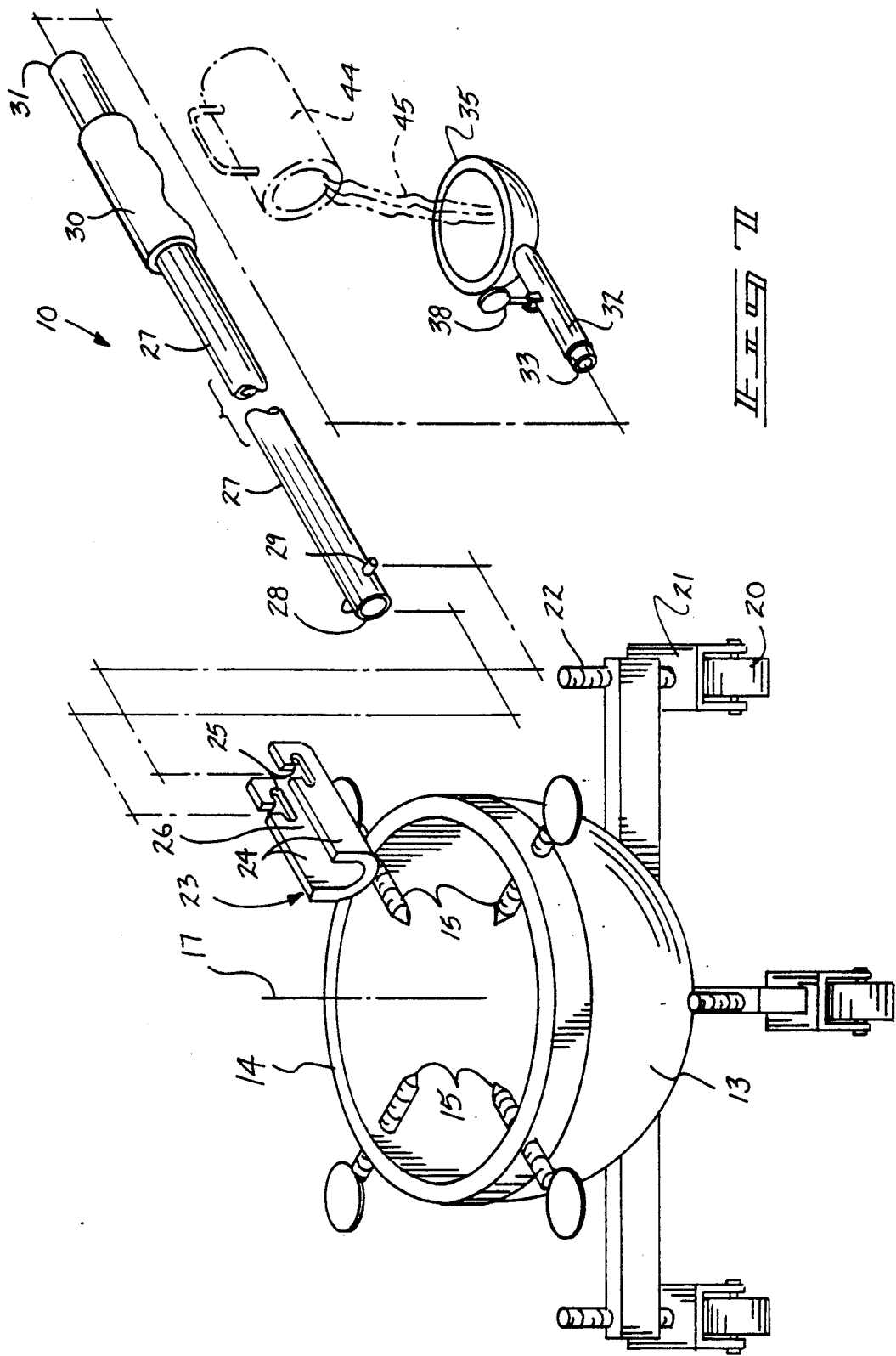
FIG. 7 is an isometric view of the invention in an exploded illustration.

A valve lever 38 is pivotally mounted to the second conduit about a valve lever axle 38, with the valve lever 38 projecting into the second conduit and having a valve lever extension rod 39 within the second conduit pivotally mounted to the valve lever 38 about a second valve axle 40. A valve plate 41 is pivotally mounted to the valve member extension rod 39 about a third axle 42, with the valve plate 41 itself pivotal about a fourth axle 43 oriented diametrically relative to the second conduit, whereupon pivoting of the valve lever effects displacement of the valve lever extension rod and pivoting of the valve plate 41 to direct fluid through the second conduit from the cup member 35. As illustrated in FIG. 7, a fluid container 44 directs fluid 45 from the fluid container 44 into the cup member 35 for watering in a remote manner of a Christmas tree mounted within the container 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Christmas tree stand apparatus, comprising,
   a container, the container having a floor and a continuous side wall, with the side wall including a continuous entrance end, and the container symmetrically oriented about a container axis, and
   a plurality of fastener rods orthogonally oriented relative to the container axis radially and threadedly directed through the side wall, and
   a plurality of support legs fixedly mounted exteriorly of the container to the container floor, with the support legs each having a plurality of leg distal ends, and each of said leg distal ends includes an externally threaded support rod threadedly directed through said leg distal end, with each support rod oriented parallel and an equal distance relative to the axis, and each support rod including a wheel member rotatably mounted relative to the support rod oriented below the support rod, and
   a U-shaped support fixedly mounted to the container entrance end, and the U-shaped support including spaced parallel support side walls and a support floor, with the support floor and the support side walls defining a support channel, and the support channel directed into the container, and the support channel oriented at an oblique angle relative to the container axis, and the support side walls each including a T-shaped slot, and each T-shaped slot oriented parallel and coextensive relative to one another, and a first conduit, the first conduit having a first conduit exit end and a first conduit entrance end, with the first conduit having a plurality of guide lugs fixedly mounted to the first conduit in adjacency to the first conduit exit end, and the guide lugs diametrically directed through the first conduit, and the guide lugs arranged for reception with the T-shaped slots.

2. An apparatus as set forth in claim 1 wherein the first conduit includes a circumferentially oriented resilient handle sheath mounted about the first conduit in adjacency to the first conduit entrance end for ease of grasping of the first conduit and pivoting the first conduit relative to the U-shaped support.

3. An apparatus as set forth in claim 2 including a second conduit having a second conduit entrance end and a second conduit exit end, and the second conduit symmetrically oriented about a second conduit axis, and the second conduit having a resilient "O" mounted about the second conduit in adjacency to the second conduit exit end, with the "O" ring arranged for sealing reception with the first conduit entrance end, and a cup member, with the cup member fixedly mounted to the second conduit entrance end, and the cup member symmetrically oriented about a cup member axis, and the cup member axis orthogonally oriented relative to the second conduit axis, and the cup member having a cup member exit opening coextensive with the second conduit entrance end.

4. An apparatus as set forth in claim 3 including a valve member mounted to the second conduit, with the valve member having a valve lever pivotally directed through the second conduit about a valve lever axle, and the valve lever including an extension rod pivotally mounted to the valve member about a second axle, and the second axle and the valve lever extension rod positioned within the second conduit, and the valve lever extension rod including a valve plate, and the valve plate pivotally mounted to the valve lever extension rod spaced from the valve lever, and the valve plate having a third axle pivotally mounting the valve plate to the valve lever extension rod, and the valve plate including a fourth axle, with the fourth axle diametrically directed through the second conduit and medially of the valve plate, with the third axle spaced from the fourth axle and the fourth axle, the third axle, the second axle, and the valve lever axle oriented parallel relative to one another, whereupon pivoting of the valve lever effects displacement of the valve lever extension rod and pivoting of the valve plate permitting fluid flow from the cup member through the second conduit into the first conduit and along the U-shaped support into the container.

* * * * *